United States Patent Office 3,023,176
Patented Feb. 27, 1962

3,023,176
HARDENABLE WATER DISPERSIBLE AMINO-
PLAST COMPOSITIONS
Armin Hiestand, Binningen, Switzerland, assignor to Ciba Limited, Basel, Switzerland, a Swiss firm
No Drawing. Filed Feb. 29, 1960, Ser. No. 11,423
Claims priority, application Switzerland Mar. 13, 1959
17 Claims. (Cl. 260—21)

It is known to use hardenable aminoplasts containing aliphatic hydrocarbon radicals of high molecular weight as dressing, hydrophobizing or softening agents in the textile industry. There are suitable, for example, condensation products of methylolmelamines or ethers thereof with aliphatic carboxylic acids of high molecular weight. Such products are insoluble in water and must therefore be applied to the textile material as solutions in organic solvents, or in the form of aqueous dispersions prepared with suitable dispersing agents and protective colloids. To render such aminoplasts containing aliphatic hydrocarbon radicals of high molecular weight soluble in water, cation-active or anion-active groups capable of salt formation have been introduced. These water-soluble products are very suitable for many fields of application, but they have the disadvantage that, owing to their cation-activity or anion-activity respectively, they cannot be applied at will in combination with other products generally used in improving textile materials. The object of the present invention is a number of new aminoplasts containing hydrocarbon radicals of high molecular weight the solubility in water of which is brought about by the introduction of non-ionic, hydrophilic groups. Such products are substantially compatible with other textile treating agents.

Accordingly, the present invention provides new, hardenable condensation products that are soluble in water or at least readily dispersible therein without assistance of a dispersing agent and that are obtained when, in any desired order of succession, the following components are reacted together:

(a) A methylol compound of a compound of the aminotriazine or urea group, or an ether thereof with a lower alcohol, or a mixture of the components giving rise to such a methylol compound, or an ether thereof, (b) An aliphatic compound containing a chain of at least 7 carbon atoms and a reactive hydrogen atom bound to a hetero atom, and (c) A compound that is capable of introducing atomic groupings that raise the hydrophility in a non-ionic manner.

The relative proportions of the components must be adapted to one another so that the final product possesses the requisite hardening capacity and necessary solubility.

As formaldehyde condensation product of the aminotriazine group (component a) there may be used, quite generally, any product that contains at least two free methylol groups or at least two methylol groups etherified with a lower alcohol. Special mention among these compounds deserve reaction products of formaldehyde with 2:4:6-triamino-1:3:5-triazine, generally called melamine. Such condensation products may contain two to six methylol groups, and most frequently they are mixtures of different compounds. Furthermore, they are suitable methylol compounds of melamine derivatives that further contain at least one amino group, for example methylol compounds of melam, melem, ammeline, ammelide, or of halogen-substituted aminotriazines, such as 2-chloro-4:6-diamino-1:3:5-triazine; likewise suitable are methylol compounds of guanamines such, for example, as those of stearoguanamine, benzoguanamine, acetoguanamine or formoguanamine.

The ethers with lower alcohols, which are likewise suitable starting materials, may be derived from the compounds referred to above with methanol, ethanol, propanols or butanols, i.e. with alcohols having from 1 to 4 carbon atoms. There may be used, for example, methyl ethers of methylolmelamines containing 3 to 6 methylol groups, 3 to 6 of which are etherified.

The formaldehyde condensation products of the aminotriazine group can be used in the predominantly monomeric or partially condensed state. A suitable starting material is, for example, a water-soluble hexamethylol melamine hexamethyl ether.

As formaldehyde condensation products of the urea group there may be used in the present process, quite generally, any product that contains at least two free methylol groups or at least two methylol groups that are etherified with a lower alcohol. As compounds of the urea group there may be mentioned, for example, urea, thiourea and compounds containing the atomic grouping

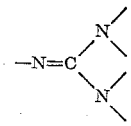

such as dicyandiamide, dicyandiamidine, guanidine, acetoguanidine or biguanidine. A suitable starting material is, for example, dimethylol urea.

From among the aliphatic compounds that contain a chain of at least 7 carbon atoms and are suitable for use as reaction component (b) there may be mentioned, above all, those in which the reactive hydrogen atom is bound to an oxygen atom or to a non-basic nitrogen atom. Compounds containing a non-basic nitrogen atom are amide-like substances; as examples may be mentioned amides obtained, on one hand, from ammonia or a primary amine such as methylamine, ethylamine, dodecylamine, octadecylamine or cyclohexylamine and, on the other, a carboxylic acid such as acetic, chloracetic, butyric, capric, lauric, stearic, behenic or oleic acid; furthermore substituted ureas such as monododecyl urea; urethanes such, for example, as those obtainable from chloroformic acid esters of high molecular alcohols with ammonia or primary amines, such as octadecyl urethane.

As compounds in which a reactive hydrogen atom is bound to an oxygen atom there are suitable alcohols and N-alkylol compounds. Suitable alcohols may be primary, secondary or tertiary, and they may be unbranched, such, for example, as lauryl alcohol, cetyl alcohol, octadecyl alcohol, or 2-butyl-octanol.

The N-alkylol compounds, which are particularly suitable as starting materials in the present process, are more especially N-methylol or N-ethylol compounds of amides or amide-like derivatives of capric, lauric, stearic, behenic, oleic, ricinoleic or montanic acid. Compounds especially suitable as reaction component (b) are those which contain a chain of at least 18 carbon atoms, more especially derivatives of stearic acid, preferably the stearic acid-N-methylolamide and the stearic acid-N-ethylolamide.

As compounds to be used as component (c), and which are capable of introducing atomic groupings that can increase the hydrophility in a non-ionic manner, there are especially suitable compounds containing polyglycol ether chains or a plurality of hydroxyl groups; quite generally, any compound will serve this purpose that contains a plurality of hydroxyl groups or polyglycol ether chains or is capable of forming them, and is capable of reacting with the methylol derivative or an ether thereof. Compounds containing a plurality of hydroxyl groups are the aliphatic polyhydric alcohols such as glycerol, or polyhydroxy-carboxylic acids such as glucuronic or galacturonic acids.

As compounds that contain, and are capable of introducing, polyglycol ether chains there are preferably used the diglycols and polyglycols, most advantageously the commercial products having an average molecular weight of 200, 400, 1000, 1500, 3000 or more. Likewise suitable are derivatives of polyglycols, such as partial ethers or esters, for example a polyglycol acetate, a polyglycol chloride or a polyglycol methyl ether or glycerol etherified with 1, 2 or 3 polyglycols.

As compounds capable of introducing several hydroxyl groups or polyglycol ether chains there may be used lower aliphatic alkylene oxides, such as propylene oxide, butylene oxide, glycide and more especially ethylene oxide.

Instead of using unitary compounds as reactants (a) to (c) in the present process there may, of course, also be used mixtures of 2 or more such substances.

The substances to be used in the manufacture of the compounds of the invention can be prepared in the following manner: In a first stage the substance referred to under (a) and (c) above are condensed together, and the resulting condensate is reacted with a substance mentioned under (b). Alternatively the components mentioned under (a) and (b) are combined and the resulting product is then reacted with the component (c); or components (b) and (c) are condensed together and the resulting condensate is reacted with the component (a). Finally, it is also possible to react all three components simultaneously; this procedure is especially recommended when there is used as component (a) instead of the methylol compound or of an ether thereof, a mixture of the substances forming the methylol compound, the methylol compound, or its ether, being formed in situ. Preferably, the components (b) and (c) are first condensed together, and this binary condensate is then reacted with the component (a).

The individual process steps are advantageously conducted in the manner conventionally employed for comparable condensations. The components are advantageously reacted at an elevated temperature, preferably at a temperature above 80° C., for example at 100 to 200° C. The reactants can be simply melted together, or they are reacted in the presence of an inert solvent. It may be of advantage to perform the reactions under reduced pressure and/or in an inert gas, for example in a current of nitrogen.

The relative molecular proportions of the components to be used depends principally on the number of methylol groups or methylol ether groups present in component (a). To ensure that the condensation products remain hardenable, the molecular ratio of the components should in all cases be selected so that the final product contains at least one free methylol group or at least one methylol group etherified with a lower alcohol. Furthermore, the ratio component (b) to component (c) should be adjusted so that the final product is soluble in water or at least readily dispersible therein without assistance of a dispersing agent. It has been observed that in general a smaller number of hydrophilic groups suffices when in a first stage components (b) and (c) are condensed together and the resulting binary condensate is reacted with component (a) than when first components (a) and (b) are reacted together and the reaction product is then condensed with component (c). When component (a) is used in the form of a melamine derivative, there are used per mol methylol melamine or methylol melamine ether: as component (b) preferably 2 to 3 mols of a fatty acid methylolamide or ethylolamide, and as component (c) 1 to 2 mols of a polyglycol having a molecular weight of about 100 to 600.

The products of the present invention can be used as auxiliaries, for example in the textile, leather and paper industries. They may be applied as hydrophobizing agents or crease-resistant finishes, or as agents counteracting shrinkage in washing, or more especially as softening agents.

The treatment of the textile material in an aqueous solution is performed by the impregnating methods known in the textile industry. It is of advantage to perform after the impregnation and drying a heat treatment at an elevated temperature, for example at 120 to 150° C., preferably in the presence of a conventional hardening catalyst such as an acid, for example hydrochloric, sulfuric or formic acid. There may also be used salts of strong acids with weak bases, for example ammonium salts of strong inorganic or organic acids, such as ammonium chloride, ammonium sulfate, ammonium nitrate, ammonium oxalate or ammonium lactate; likewise suitable are metal salts such as zinc nitrate, aluminum sulfate or magnesium chloride. When a solution in an organic solvent is used, the catalyst should be soluble in the organic solvent, being, for example, a strong organic acid such as formic acid, acetic acid or chloracetic acid, or a compound that furnishes acid when heated.

Furthermore, it may be of great advantage to improve the fixation of the impregnation on the textile material by treating it with a crosslinking substance, in addition to or in place of the afore-mentioned hardening. Suitable crosslinking substances are the polyfunctional compounds conventionally used in textile finishing, such as formaldehyde, dihydroxy and polyhydroxy compounds, diisocyanates or derivatives thereof, and the like.

The products of the present process may be applied as such or in admixture with other substances, such as salts, more especially salts of weak acids such as sodium acetate, aluminum acetate, aluminum triformate, or zirconium compounds, for example zirconium salts or a solution of hydrated zirconium dioxide, also in combination with hydrocarbons, such as kerosine, solvents, methylolamides, protective colloids, dressing or matting agents such as methylol ureas, weighting or softening agents or the like. Such additives must, however, be selected so that they do not cause the products of the invention to precipitate from their solutions.

Textile materials to be treated by the present process may be in the form of sheets, loose fibers, yarns or woven fabrics. There may be mentioned materials of cellulose esters, for example acetate rayon, as well as those obtained by polycondensation, such as polyamides (nylon, Perlon) or polyesters (Terylene, Dacron), and finally those which have been manufactured by polymerization, such as polyvinyl chloride or polyacrylic derivatives. The present process is primarily used for improving cellulosic textile materials, for example those of native or regenerated cellulose, such as linen, cotton, rayon (viscose) or spun rayon.

It is, of course, also possible to treat blended fibers or blended weaves consisting of different man-made fibers, or of man-made and natural fibers.

Unless otherwise indicated, parts in the following examples are parts by weight, and the relationship between parts by weight and parts by volume is the same as that between the kilogram and the liter.

*Example 1*

66 grams (0.2 mol) of stearic acid methylolamide and 36 grams (0.1 mol) of hexamethylol melamine hexamethyl ether are reacted for 2 hours at 115 to 120° C. under a good water-jet vacuum. The wax-like reaction product, which is insoluble in water, is then condensed under identical conditions as described above for 14 hours with 20 grams (0.1 mol) of a polyethylene glycol having a molecular weight of 200. A wax-like product is obtained which can be dispersed in water and is very readily soluble in hot water. When the solution is allowed to cool completely, it contains deposits of a mother-of-pearl sheen.

When the 66 grams of stearic acid methylolmelamide are replaced by 68 grams of N-methylol octadecyl urethane, a water-soluble, wax-like product is likewise obtained.

When 30 grams of a polyglycol of molecular weight 300 and 40 grams of a polyglycol of molecular weight 400 are used, similar products of better solubility in water are obtained.

Example 2

When the process described in Example 1 is performed with 99 grams (0.3 mol) of stearic acid methylolamide, 36 grams (0.1 mol) of the same hexamethylol melamine hexamethyl ether and 60 grams (0.1 mol) of a polyethylene glycol of molecular weight 600, a soft, waxy condensation product results which gives a clear solution in hot water.

Example 3

By heating at 115–120° C. in a water-jet vacuum a mixture of 123 grams (about 0.2 mol) of a water-soluble reaction product obtained by a known process under acid conditions from 1 mol of stearic acid methylolamide and 1 mol of polyethylene glycol of molecular weight 300, and 36 grams (0.1 mol) of the hexamethylol melamine hexamethyl ether mentioned in Example 1, there is likewise obtained a pale-brown, waxy substance which is readily soluble in water.

Similar products, having a better or slightly inferior solubility, can be prepared from polyethylene glycols of molecular weight 200, 400 or 600. The solutions of 1% strength of these products are opalescent and some of them have a mother-of-pearl sheen.

Example 4

When a mixture of 60 grams of polyethylene glycol of molecular weight 600, 36 grams of the methylol melamine hexamethyl ether mentioned in Example 1, and 66 grams of a stearic acid methylolamide containing boric acid is heated for 6 hours at 120° C. under a pressure of 15 mm. Hg, there is likewise formed a waxy product which gives a clear solution in hot water.

Example 5

By the procedure described in Example 1, except that 63 grams (0.2 mol) of stearic acid ethanolamide are used instead of the methylolamide mentioned in that example, a water-soluble, waxy substance is formed.

A similar product is obtained from 77 grams (0.2 mol) of behenic acid ethanolamide.

Example 6

The procedure is as described in Example 3, except that the reaction product of methylolamide with polyethylene glycol is replaced by 96 grams (0.2 mol) and 123 grams (0.2 mol) respectively of a reaction product of 1 mol of stearic acid ethanolamide with 4 and 8 mols respectively of ethylene oxide, wax-like substances are likewise obtained which are very readily soluble in water.

Example 7

When the process described in Example 1, 2 or 5 is performed with the use of 1 mol each of a polyethylene glycol of molecular weight 1000, 1540, 2000 and 6000 respectively for every mol of melamine derivative, soft, wax-like substances of very good solubility in water are obtained.

Similar products can be obtained as described in Example 3, with the use of the polyglycols mentioned above.

Example 8

By condensing at 120° C. in a water-jet vacuum 0.02 mol each, that is to say 25, 45 and 85 grams of the condensation products obtained from 1 mol of coconut fatty acid methylolamide and 1 mol each of a polyethylene glycol of molecular weight 1000, 2000 and 4000 respectively with 3.6 grams (0.01 mol) each of the hexamethylol melamine hexamethyl ether mentioned in Example 1, very soft, waxy products are obtained which are very readily soluble in water.

Example 9

90 grams of a condensation product from stearic acid methylolamide and an etherification product, containing about 3 methoxy groups, of hexamethylolamine and methanol are heated with 30 grams of a polyglycol of molecular weight 300, for 6 hours at 115 to 120° C. under a pressure of 10 to 15 mm. Hg, while being stirred when all has turned into a melt. The viscid melt solidifies upon cooling to form a water-soluble wax-like substance.

Example 10

A mixture of 60 grams (about 0.1 mol) of a water-soluble etherification product prepared from 1 mol of stearic acid methylolamide and 1 mol of polyglycol of molecular weight 300 is heated for 3 hours at 115 to 120° C. under reduced pressure with 21 grams (about 0.1 mol) of a methylol urea methyl ether in which more than 2 mols of formaldehyde per mol of urea have been incorporated by condensation. A water-soluble, waxy substance is obtained.

Example 11

Cotton poplin or viscose crepe is treated on a padder with an aqueous liquor containing per liter 2.5 to 5 grams of an aqueous paste of 50% strength of each of the preparations manufactured as described in Examples 1 to 6, 9 and 10, as well as 4 to 6 grams per liter of ammonium chloride, and the fabric is expressed until its weight shows an increase of about 100%, dried, and then heated for 5 minutes at 140° C.

The fabric treated in this manner has a good, soft handle which is not affected by washing the fabric for 15 minutes at 90° C. in a bath containing per liter 2 grams of the disodium salt of 2-heptadecyl-N-benzyl-benzimidazole-disulfonic acid and 0.5 gram of ammonia of 25% strength.

Example 12

When the process described in Example 11 is performed with aqueous pastes of 50% strength of the preparations manufactured as described in Examples 7 and 8, the finish produced is not quite so hydrophobic as that produced according to Example 11.

Example 13

A mixture of 300 grams (1 mol) of stearic acid methylolamide, 106 grams (1 mol) of diethylene glycol and 1.8 grams of anhydrous sodium carbonate is stirred for 14 hours at 120° C. under a water-jet vacuum of 40 to 50 mm. Hg. The resulting brittle, waxy, very pale-yellow substance is readily dispersible in warm water.

The resulting melt is then stirred for a further 6 hours under the conditions specified with 180 grams (½ mol) of a water-soluble hexamethylol melamine hexamethyl ether. The initially observed violent boiling of the mixture subsides gradually. The cold reaction product is a yellow, slightly soft, waxy substance. When it is allowed to swell for several hours while being very gently stirred at 60° C. with three times its own amount of water, it forms a white, slightly colloidal paste which can be diluted in any desired proportion by being covered with hot water.

Similar products are obtained by using in the process described above 150 grams (1 mol) of triethylene glycol instead of diethylene glycol, or when 360 grams (about 1 mol) of behenic acid methylolamide are reacted with 150 grams (1 mol) of triethylene glycol, or with 200 grams (about 1 mol) of a tetraalkylene glycol and with 180 grams (½ mol) of the melamine compound mentioned above.

A soft handle is imparted to viscose yarn by treating it as described in Example 11 with 2 to 5 grams per liter of one of the pastes of 25% strength.

*Example 14*

A mixture of 39 grams (0.1 mol) of a highly methylated hexamethylol melamine and 35 grams (0.1 mol) of methoxy heptaethylene glycol is stirred for 4 hours at 120° C. in a water-jet vacuum of 30 to 40 mm. Hg, to yield 70.4 grams of a colorless, water-soluble resinous substance which is then condensed with 60 grams (0.2 mol) of stearic acid methylolamide for 16 hours at 120° C. in vacuo under identical conditions. When the resulting water-soluble, waxy substance is applied to textile material as described in Example 11, the material so treated has a softer handle.

*Example 15*

Using the same procedure as described in Example 1 and 41 grams (about 0.1 mol) of an octa-ethyleneglycol monochloride instead of 20 grams (0.1 mol) of a polyethyleneglycol of molecular weight 200, there is obtained a water-soluble wax-like mass which is applied as described in Example 11 giving the textile material so treated a softer handle.

What is claimed is:

1. The new hardenable condensation product which is soluble in water to at least dispersible in water without assistance of a dispersing agent and which has been obtained by condensing at an elevated temperature, (a) a member selected from the group consisting of methylol-aminotriazines, methylol-ureas and ethers of these methylol compounds with aliphatic alcohols with up to 4 carbon atoms and mixtures of the components giving rise to such methylol compounds and ethers thereof obtained with alcohols with up to 4 carbon atoms, (b) a member selected from the group consisting of methylol amides and ethylol amides of fatty acids containing at least 18 carbon atoms, and (c) a member selected from the group consisting of a polyethylene glycol having a molecular weight of about 100 to 600, a mono-lower alkyl ether thereof and a monochloride thereof.

2. The product according to claim 1, which has been obtained by condensing in a first stage the components (a) and (b) and condensing the resulting condensate with component (c).

3. The product according to claim 1, which has been obtained by condensing in a first stage the components (b) and (c) and condensing the resulting condensate with component (a).

4. The product according to claim 1, which has been obtained by condensing in a first stage component (b) with a mixture of the reactants yielding the methylol compounds and the ethers thereof mentioned under (a) and condensing the resulting condensate with component (c).

5. The new hardenable condensation product which has been obtained by condensing at a temperature from 80 to 200° C. 1 mol of hexamethylol melamine hexamethyl ether with two mols of stearic acid methylol amide and condensing this condensate with 1 mol of polyethylene glycol of molecular weight 200.

6. The new hardenable condensation product which has been obtained by condensing at a temperature from 80 to 200° C. 1 mol of a hexamethylol melamine methyl ether containing about 3 methoxy groups with 2 mols of stearic acid methylolamide and condensing this condensate with 1 mol of polyethylene glycol of molecular weight 300.

7. The new hardenable condensation product which has been obtained by condensing at a temperature from 80 to 200° C. 1 mol of stearic acid ethanol amide with 4 mols of ethylene oxide and condensing 2 mols of this condensate with 1 mol of hexamethylol metlamine hexamethyl ether.

8. The new hardenable condensation product which has been obtained by condensing at a temperature from 80 to 200° C. 1 mol of stearic acid methylolamide with 1 mol of diethylene glycol and condensing this condensate with 0.5 mol of hexamethylol melamine hexamethyl ether.

9. The new hardenable condensation product which has been obtained by condensing at a temperature from 80 to 200° C. 1 mol of methoxy heptaethylene glycol with 1 mol of highly methylated hexamethylol melamine and condensing this condensate with 2 mols of stearic acid methylolamide.

10. The new hardenable condensation product which has been obtained by condensing at a temperature from 80 to 200° C. 1 mol of hexamethylolmelamine hexamethyl ether with 2 mols of stearic acid methylolamide and condensing this condensate with 1 mol of octaethylene glycol monochloride.

11. A textile material having incorporated in it in the hardened form the new hardenable condensation product which is soluble in water to at least dispersible in water without assistance of a dispersing agent and which has been obtained by condensing at an elevated temperature (a) a member selected from the group consisting of methylol-aminotriazines, methylol-ureas and ethers of these methylol compounds with aliphatic alcohols with up to 4 carbon atoms and mixtures of the components giving rise to such methylol compounds and ethers thereof obtained with alcohols with up to 4 carbon atoms, (b) a member selected from the group consisting of methylol amides and ethylol amide of fatty acids containing at least 18 carbon atoms, and (c) a member selected from the group consisting of a polyethylene glycol having a molecular weight of about 100 to 600, a mono-lower alkyl ether thereof and a monochloride thereof.

12. A cellulosic textile material rendered soft and having incorporated in it in the hardened form the new hardenable condensation product which has been obtained by condensing at a temperature from 80 to 200° C. 1 mol of hexamethylol melamine hexamethyl ether with two mols of stearic acid methylol amide and condensing this condensate with 1 mol of polyethylene glycol of molecular weight 200.

13. A cellulosic textile material rendered soft and having incorporated in it in the hardened form the new hardenable condensation product which has been obtained by condensing at a temperature from 80 to 200° C. 1 mol of a hexamethylol melamine methyl ether containing about 3 methoxy groups with 2 mols of stearic acid methylolamide and condensing this condensate with 1 mol of polyethylene glycol of molecular weight 300.

14. A cellulosic textile material rendered soft and having incorporated in it in the hardened form the new hardenable condensation product which has been obtained by condensing at a temperature from 80 to 200° C. 1 mol of stearic acid ethanol amide with 4 mols of ethylene oxide and condensing 2 mols of this condensate with 1 mol of hexamethylol melamine hexamethyl ether.

15. A cellulosic textile material rendered soft and having incorporated in it in the hardened form the new hardenable condensation product which has been obtained by condensing at a temperature from 80 to 200° C. 1 mol of stearic acid methylolamide with 1 mol of diethylene glycol and condensing this condensate with 0.5 mol of hexamethylol melamine hexamethyl ether.

16. A cellulosic textile material rendered soft and having incorporated in it in the hardened form the new hardenable condensation product which has been obtained by condensing at a temperature from 80 to 200° C. 1 mol of methoxy heptaethylene glycol with 1 mol of highly methylated hexamethylol melamine and condensing this condensate with 2 mols of stearic acid methylolamide.

17. A cellulosic textile material rendered soft and having incorporated in it in the hardened form the new hardenable condensation product which has been obtained by condensing at a temperature from 80 to 200° C. 1 mol of hexamethylolmelamine hexamethyl ether with 2 mols of stearic acid methylolamide and condensing this condensate with 1 mol of octaethylene glycol monochloride.

References Cited in the file of this patent

UNITED STATES PATENTS

| | | |
|---|---|---|
| 2,853,459 | Christenson et al. | Sept. 23, 1958 |
| 2,864,781 | Albrecht et al. | Dec. 16, 1958 |
| 2,915,486 | Shelley | Dec. 1, 1959 |
| 2,927,090 | Hiestand et al. | Mar. 1, 1960 |